United States Patent [19]
Moskowitz et al.

[11] Patent Number: 5,017,524
[45] Date of Patent: May 21, 1991

[54] CERAMIC CUTTING TOOL

[75] Inventors: David Moskowitz, Southfield, Mich.; Reuven Porat, Nahariya, Israel

[73] Assignee: Iscar Ltd., Tefen, Israel

[21] Appl. No.: 507,968

[22] Filed: Apr. 11, 1990

Related U.S. Application Data

[63] Continuation-in-part of Ser. No. 309,142, Feb. 13, 1989, abandoned.

[51] Int. Cl.$^5$ .................. C04B 35/10; C04B 35/56; C04B 35/58
[52] U.S. Cl. ........................... 501/87; 501/127
[58] Field of Search ................. 501/87, 127

[56] References Cited

U.S. PATENT DOCUMENTS

| | | | |
|---|---|---|---|
| 4,320,203 | 3/1982 | Brandt et al. | 501/87 |
| 4,366,254 | 12/1982 | Rich et al. | 501/89 |
| 4,526,875 | 7/1985 | Yamamoto et al. | 501/87 |
| 4,543,343 | 9/1985 | Iyori et al. | 501/87 |
| 4,598,053 | 7/1986 | Yamakawa et al. | 501/104 |
| 4,746,563 | 5/1988 | Nakano et al. | 428/216 |

Primary Examiner—William R. Dixon, Jr.
Assistant Examiner—Deborah Jones
Attorney, Agent, or Firm—Gifford, Groh, Sprinkle, Patmore and Anderson

[57] ABSTRACT

A composition for a ceramic cutting tool which enjoys long tool life at high speed machining of ferrous alloys. The composition consists essentially of 60-80% alpha aluminum oxide ($Al_2O_3$) having a hexagonal crystal structure and the remainder of titanium carbonitride (TiCN). The titanium carbonitride has a mixture of 30-70% titanium carbide and the remainder titanium nitride. The mixture is compacted and hot pressed, sintered or pressure sintered to form the tool.

4 Claims, 2 Drawing Sheets

CERAMIC CUTTING TOOL

CROSS REFERENCE TO RELATED APPLICATIONS

This application is a continuation-in-part of U.S. patent application Ser. No. 309,142, filed Feb. 13, 1989, entitled CERAMIC CUTTING TOOL, now abandoned.

BACKGROUND OF THE INVENTION

I. Field of the Invention

The present invention relates to ceramic cutting tools.

II. Description of the Prior Art

There are a number of previously known ceramic cutting tools and most of these cutting tools are based on aluminum oxide as the primary material. Most of these previously known ceramic cutting tools are capable of machining ferrous metals at high speeds only during finishing operations where the feed rate of the tool and the cutting depth is relatively light. This limitation is due primarily to the low thermal shock resistance of these ceramic tools so that the tools crack and chip with higher feed rates and cutting depths.

There have, however, been a number of previously known ceramic cutting tools which have titanium carbide as an additive for the cutting tool. Such cutting tools are known as "black ceramics" due to their color. The black ceramics have better thermal shock resistance than the tools made only from aluminum oxide due to the better thermal conductivity of titanium carbide than aluminum oxide.

While such "black ceramics" are capable of higher tool feed rates than aluminum oxide tools due to their higher thermal conductivity, such "black ceramics" disadvantageously have limited tool life.

SUMMARY OF THE PRESENT INVENTION

The present invention provides a composition for a ceramic cutting tool which enjoys improved tool life over the previously known cutting tools.

In brief, the cutting tool composition of the present invention consists essentially of 60-80% alpha aluminum oxide ($Al_2O_3$) having a hexagonal crystal structure and the remainder of titanium carbonitride (TiCN). The titanium carbonitride has a mixture of 30-70% titanium carbide and the remainder titanium nitride. A mixture of 30%-50% titanium carbide and 50%-70% titanium nitride has been found to be the preferred mixture for the titanium carbonitride.

The mixture is compacted and hot pressed or sintered to form the tool.

BRIEF DESCRIPTION OF THE DRAWING

The present invention will be better understood upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
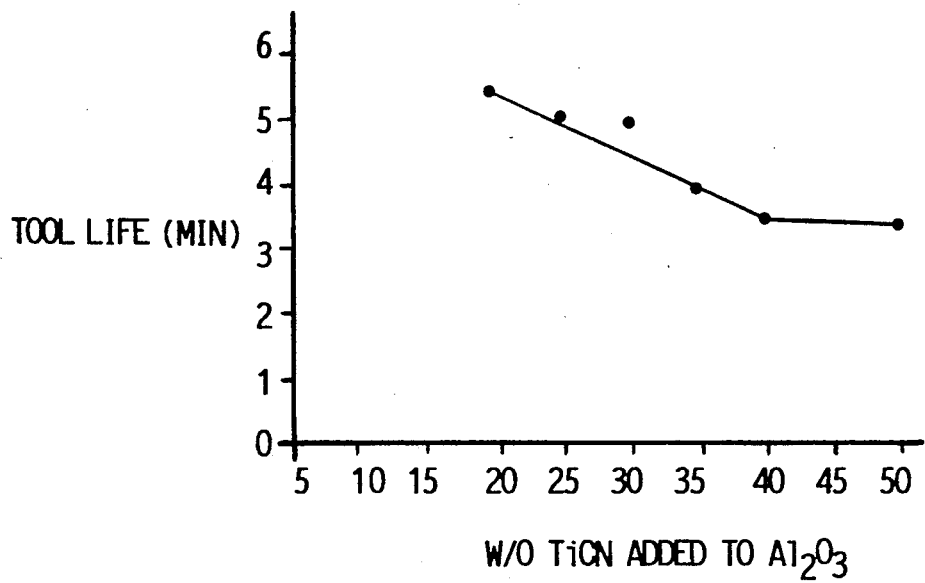
FIG. 1 is a graph illustrating tool life v. w/o titanium carbonitride added to the aluminum oxide.

In brief, the cutting tool composition of the present invention consists essentially of 60-80% alpha aluminum oxide ($Al_2O_3$) having a hexagonal crystal structure and the remainder of titanium carbonitride (TiCN). The preferred embodiment consists of 70% aluminum oxide and the remainder of 30% titanium carbonitride.

The titanium carbonitride has a mixture of 30%-70% by weight titanium carbide and the remainder titanium nitride. A mixture of 30%-50% titanium carbide and 50%-70% titanium nitride has been found to be the preferred mixture for the titanium carbonitride.

In practice, a fine powder of the aluminum oxide and a fine powder of titanium carbonitride in the appropriate ratios by weight are added to a ball mill and thoroughly mixed with a medium, such as ethyl alcohol. Twenty hours of mixing in the ball mill has been found to be sufficient.

The medium is then evaporated and the remaining mixed powder from the slurry is screened through a 20 mesh screen. The screened powder is then placed in a graphite mold and compressed at 1000 psi. The resulting compact is the heated up to about 1600° C. over a three hour period during which the pressure is raised from 1000to 3000psi, and then held at that temperature and pressure until densification is complete. This typically takes about one and one half hours and results in a formed billet.

The formed billet is then removed from the mold and cutting tool blanks are then cut from the billet. Any conventional means, such as resin bonded diamond wheels, are then used to shape the cutting tools from the blanks.

Tests were conducted comparing cutting tools according to the present invention with a commercially available aluminum oxide tool with a titanium carbide additive. The tests were conducted at a machining rate of 2000 sfpm on 1045 steel and a cutting depth of 0.060 inches. The results of the test are shown below:

| Results of Turning 1045 Steel with Present Invention vs. Commercial $Al_2O_3$—TiC Tool | | | | | |
| --- | --- | --- | --- | --- | --- |
| Tool | Speed sfpm | Feed ipr | Flank Wear in. | Cutting Time min. | Observation |
| Present Invention | 2000 | .0079 | .0082 | 5.24 | Tool OK |
| Present Invention | 2000 | .0079 | .0106 | 7.72 | Tool OK |
| Commercial Tool | 2000 | .0079 | .0105 | 5.24 | Chip on flank |
| Present Invention | 2000 | .0122 | .0095 | 5.20 | Tool OK |
| Commercial Tool | 2000 | .0079 | — | 3.86 | Failed by Chipping |

Several important aspects are apparent from the above table. First, the prior art tool chipped at 5.24 minutes with only a moderate feed rate of 0.0079 inches per revolution (ipr) whereas no chipping occurred with tools composed according to the present invention. Furthermore, the cutting tool of the present invention performed without chipping at even high feed rates of 0.0122 ipr whereas the prior art tool chipped at much more moderate feed rate of 0.0079 ipr.

Tests were also conducted comparing cutting tools according to the present invention with a commercially available aluminum oxide tool with zirconium oxide additive. The tests were conducted at a machining rate of 2000 sfpm on 1045 steel and a cutting depth of 0.060 inches. The results of the test are shown below:

Results of Turning 1045 Steel with Present Invention vs. Commercial $Al_2O_3$—$ZrO_2$ Tool

| Tool | Speed sfpm | Feed ipr | Flank Wear in. | Cutting Time min. | Observation |
|---|---|---|---|---|---|
| Present Invention | 2000 | .015 | .0068 | 3.34 | Tool OK |
| Commercial Tool | 2000 | .015 | .0045 | 1.67 | Crack on Rake Face |

It is important to note that the prior art tool cracked after only 1.67 minutes whereas the cutting tool according to the present invention machined for twice as long with no fracture.

FIG. 1 demonstrates the effect on tool life as a function of varying the titanium carbonitride content of the cutting tool. FIG. 1 measured the amount of time required to reach 0.010 inch flank wear and the cutting conditions were a machining rate of 1500 sfpm, a feed rate of 0.0122 ipr and a cutting depth of 0.050 inches on AISI 1045 steel.

Several aspects of FIG. 1 are important to note. First, the tool life decreased with increasing titanium carbonitride content. However, even though the 80% aluminum oxide/20% titanium carbonitride showed the longest life, it was found that this composition was unacceptable since it had a tendency to undergo catastrophic failure, especially under severe cutting conditions. The 70% aluminum oxide/30% titanium carbonitride, however, rarely demonstrated such failure and, due to its long tool life, is the preferred composition.

Figure 2:
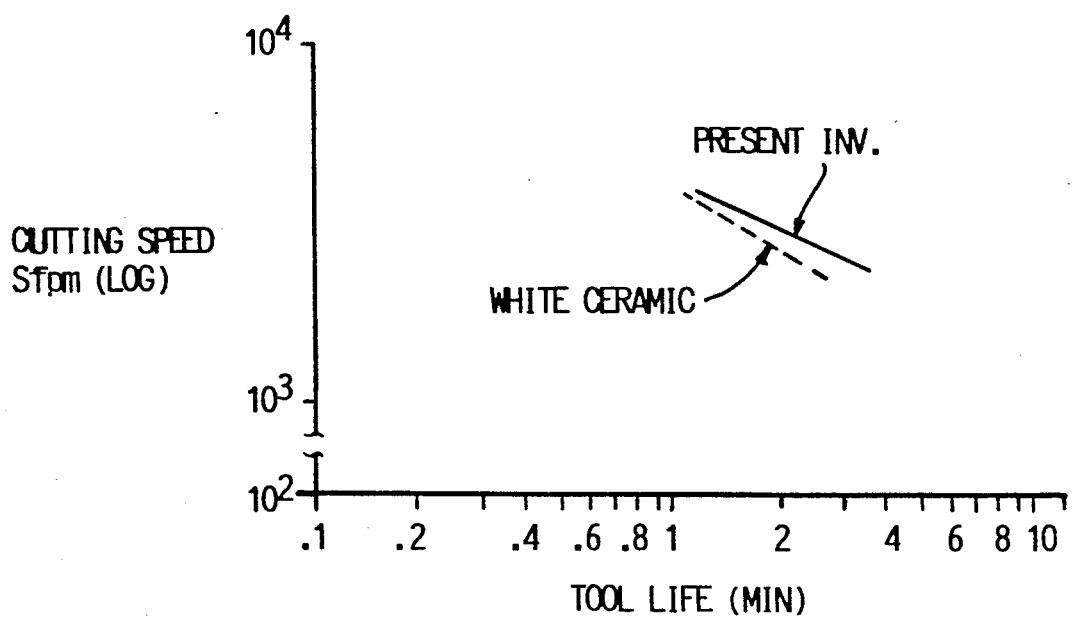
FIG. 2 is a graph of cutting tool speed v. tool life and comparing the composition of the present invention with a conventional ceramic cutting tool with titanium carbide additive.

FIG. 2 demonstrates the effect of cutting speed on tool life which machining AISI 1045 steel and also compares this effect with a prior art aluminum oxide/zirconium oxide cutting tool. The cutting tool feed rate was held at 0.010 ipr to insure that no breakage would occur for the prior art tool. The cutting tools were tested in the range of 2300 to 3900 sfpm and the cutting depth was 0.080 inch.

FIG. 2 shows that the tool of the present invention exhibited longer tool life at all machining speeds.

Figure 3:
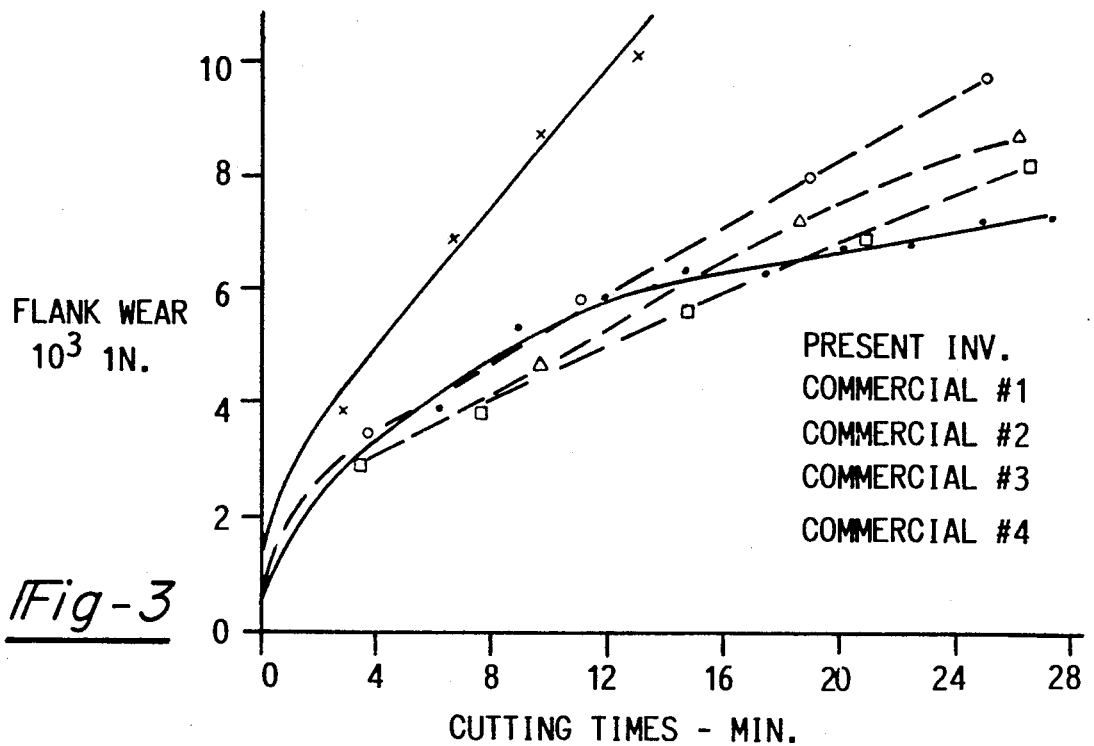
FIG. 3 is a graph of flank wear v. cutting time and comparing the composition of the present invention with four conventional ceramic cutting tools including cutting tools with titanium carbide additive.

FIG. 3 depicts the flank wear v. machining time of the present invention compared to four commercially available prior art tools. The tests shown in FIG. 3 were conducted on grey cast iron at a machining rate of 1300 sfpm, a feed rate of 0.023 ipr and a cutting depth of 0.060 inches. The tool wear, extrapolated to a flank wear of 0.010 inches, is summarized in the following table:

| Cutting Tool | Calculated Tool Life Time to .010" Flank Wear (min.) |
|---|---|
| Prior Art Tool #1 | 13.0 |
| Prior Art Tool #2 | 6.1 |
| Prior Art Tool #3 | 15.6 |
| Prior Art Tool #4 | 17.3 |
| Present Invention | 20.2 |

These tests, summarized in the above table, demonstrate that a cutting tool constructed according to the present invention exhibits 16.8% greater tool life than its closest competitor.

A further advantage of the present invention over commonly used black ceramic cutting tools is its applicability for high removal rate machining of grey cast iron. In the cutting test described below, a cutting tool according to the present invention and a commercial black ceramic insert both turned pearlitic grey cast iron at conditions of 2000 sfpm speed, 0.0243 ipr feed and 0.060 in depth of cut, representing a removal rate of 36 $in^3$/min. The table below gives the results of this test which was run in duplicate.

| Insert | Style | Cutting Time | Observation |
|---|---|---|---|
| Commercial Ceramic | SNG433T | 1.31 min. | Nose Broke |
| Commercial Ceramic | SNG433T | 1.96 min. | Nose Failed |
| Present Invention | SNG433T | 6.61 min. | .005" Flank Wear |
| Present Invention | SNG433T | 7.94 min. | .0045 Flank Wear |

Note that the insert of the present invention showed very little flank wear after 6.61 min. and 7.94 min. of machining under these conditions. The commercial black ceramic, on the other hand, failed in both cases in less than two minutes.

Figure 4:
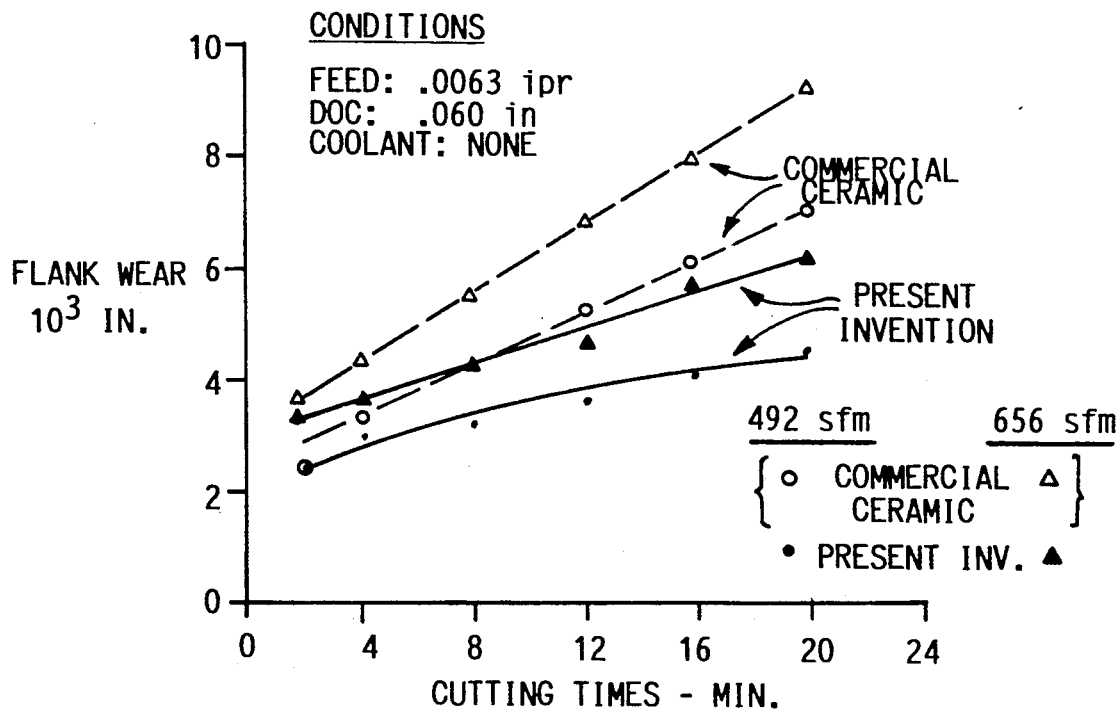
FIG. 4 is a graph of flank wear v. cutting time similar to FIG. 3 but for machining hardened steel at two different machining speeds.

The capability of demonstrating considerably longer tool life when machining hardened steel, as compared to a commercial $Al_2O_3$—$ZrO_2$ ceramic is yet another advantage of the present invention. FIG. 4 shows the flank wear as a function of cutting time turning AISI 4340 steel of 480 Brinell hardness for both above inserts. As is clear in the figure, the wear rate of the present invention at speeds of 492 and 656 sfpm was substantially lower than the commercial ceramic insert, yielding a tool life 2 to 2½ times longer.

The precise reasons for the unexpected tool life for a cutting tool composed according to the present invention is not entirely understood. However, it is believed that the improvement is due in part to the increased thermal shock resistance of the aluminum oxide/titanium carbonitride of the present invention over the previously known aluminum oxide/titanium carbide tools.

Having described my invention, many modifications thereto will become apparent to those skilled in the art to which it pertains without deviation from the spirit of the invention as defined be the scope of the appended claims.

I claim:

1. A composition for a ceramic cutting tool consisting essentially of 60–80% by weight of alpha aluminum oxide, ($Al_2O_3$) having a hexagonal crystal structure and 20–40% by weight w/w% titanium carbonitride (TiCN) wherein said titanium carbonitride consists essentially of 30–70 mol % titanium carbide and 30–70 mol % titanium nitride.

2. The invention as defined in claim 1 wherein said titanium carbonitride consists essentially of 30–50 mol % titanium carbide and 50–70 mol % titanium nitride.

3. The invention as defined in claim 1 wherein said composition consists essentially of 70% aluminum oxide and 30% titanium carbonitride (TiCN) by weight.

4. A ceramic cutting tool having a composition which consists essentially of 60–80% by weight of alpha aluminum oxide ($Al_2O_3$) and 20 to 40% by weight w/w % titanium carbonitride (TiCN) wherein said titanium carbonitride consists essentially of 30–70 mol % titanium carbide and 30–70 mol % titanium nitride, said tool being formed by compacting a mixture of said composition and then hot-pressing, sintering, or pressure sintering said compacted mixture.

* * * * *